United States Patent
Raghavan et al.

(10) Patent No.: US 11,621,761 B2
(45) Date of Patent: Apr. 4, 2023

(54) DYNAMIC ACCURACY REQUIREMENTS AND PREFERRED SUBARRAY INDICATION FOR POSITIONING

(71) Applicant: QUALCOMM Incorporated, San Diego, CA (US)

(72) Inventors: Vasanthan Raghavan, West Windsor Township, NJ (US); Sony Akkarakaran, Poway, CA (US); Tao Luo, San Diego, CA (US); Junyi Li, Franklin Park, NJ (US); Mohammad Ali Tassoudji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/237,942

(22) Filed: Apr. 22, 2021

(65) Prior Publication Data

US 2022/0345192 A1    Oct. 27, 2022

(51) Int. Cl.
  *H04B 7/06* (2006.01)
  *H04B 17/27* (2015.01)

(52) U.S. Cl.
  CPC ......... *H04B 7/0691* (2013.01); *H04B 7/0617* (2013.01); *H04B 7/0639* (2013.01); *H04B 17/27* (2015.01)

(58) Field of Classification Search
  CPC .......................... H04B 7/0617; H04B 7/0413
  USPC ....................................................... 375/262
  See application file for complete search history.

(56) References Cited

U.S. PATENT DOCUMENTS

| 10,411,775 | B2 | 9/2019 | Chang et al. | |
| 11,239,877 | B1* | 2/2022 | Chopra | H04B 1/0003 |
| 2009/0310501 | A1* | 12/2009 | Catovic | H04W 24/08 370/252 |
| 2018/0160377 | A1* | 6/2018 | Abramsky | H04W 52/283 |
| 2021/0067978 | A1 | 3/2021 | Cheraghi et al. | |

OTHER PUBLICATIONS

International Search Report and Written Opinion—PCT/US2022/070972—ISA/EPO—dated Jun. 15, 2022.

* cited by examiner

*Primary Examiner* — Sam K Ahn
*Assistant Examiner* — Gina M McKie
(74) *Attorney, Agent, or Firm* — MG-IP Law, P.C.

(57) ABSTRACT

Disclosed are techniques for wireless communication. In an aspect, a method, performed by a requirements-using network entity having an array of antenna elements, comprises determining a plurality of antenna subarray configurations, each antenna subarray configuration comprising a different subset of the antenna elements in the array of antenna elements. The method further comprises receiving, from a requirements-providing network entity, a set of one or more accuracy requirements, each accuracy requirement comprising a positioning accuracy requirement or a measurement accuracy requirement for azimuth, elevation, or both. The method further comprises either: determining an antenna subarray configuration that produces a beam that satisfies the set of accuracy requirements and performing a positioning operation using that antenna subarray configuration, or determining that no antenna subarray configuration produces a beam that satisfies the set of accuracy requirements and notifying the requirements-providing network entity of that fact.

28 Claims, 10 Drawing Sheets

DYNAMIC ACCURACY REQUIREMENTS AND PREFERRED SUBARRAY INDICATION FOR POSITIONING

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a requirements-using network entity having an array of antenna elements includes determining a plurality of antenna subarray configurations, each antenna subarray configuration comprising a different subset of the antenna elements in the array of antenna elements; receiving, from a requirements-providing network entity, a set of one or more accuracy requirements, each accuracy requirement comprising a positioning accuracy requirement or a measurement accuracy requirement for azimuth, elevation, or both; in response to the presence of an antenna subarray configuration that produces a beam that satisfies the set of accuracy requirements, performing a positioning operation using the antenna elements in the antenna subarray configuration; and in response to the absence of an antenna subarray configuration produces a beam that satisfies the set of accuracy requirements, notifying the requirements-providing network entity that the set of accuracy requirements cannot be met.

In an aspect, a method of wireless communication performed by a requirements-providing network entity includes determining a set of one or more accuracy requirements for a requirements-using network entity, each accuracy requirement comprising a positioning accuracy requirement or a measurement accuracy requirement for azimuth, elevation, or both; and sending the set of one or more accuracy requirements to the requirements-using network entity.

In an aspect, a requirements-using network entity includes an array of antenna elements; a memory; at least one transceiver; and at least one processor communicatively coupled to the memory and the at least one transceiver, the at least one processor configured to: determine a plurality of antenna subarray configurations, each antenna subarray configuration comprising a different subset of the antenna elements in the array of antenna elements; receive, via the at least one transceiver, from a requirements-providing network entity, a set of one or more accuracy requirements, each accuracy requirement comprising a positioning accuracy requirement or a measurement accuracy requirement for azimuth, elevation, or both; in response to the presence of an antenna subarray configuration that produces a beam that satisfies the set of accuracy requirements, perform a positioning operation using the antenna elements in the determined antenna subarray configuration; and in response to the absence of an antenna subarray configuration produces a beam that satisfies the set of accuracy requirements, notify the requirements-providing network entity that the set of accuracy requirements cannot be met.

In an aspect, a requirements-providing network entity includes a memory; at least one transceiver; and at least one processor communicatively coupled to the memory and the at least one transceiver, the at least one processor configured to: determine a set of one or more accuracy requirements for a requirements-using network entity, each accuracy requirement comprising a positioning accuracy requirement or a measurement accuracy requirement for azimuth, elevation, or both; and send, via the at least one transceiver, the set of one or more accuracy requirements to the requirements-using network entity.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
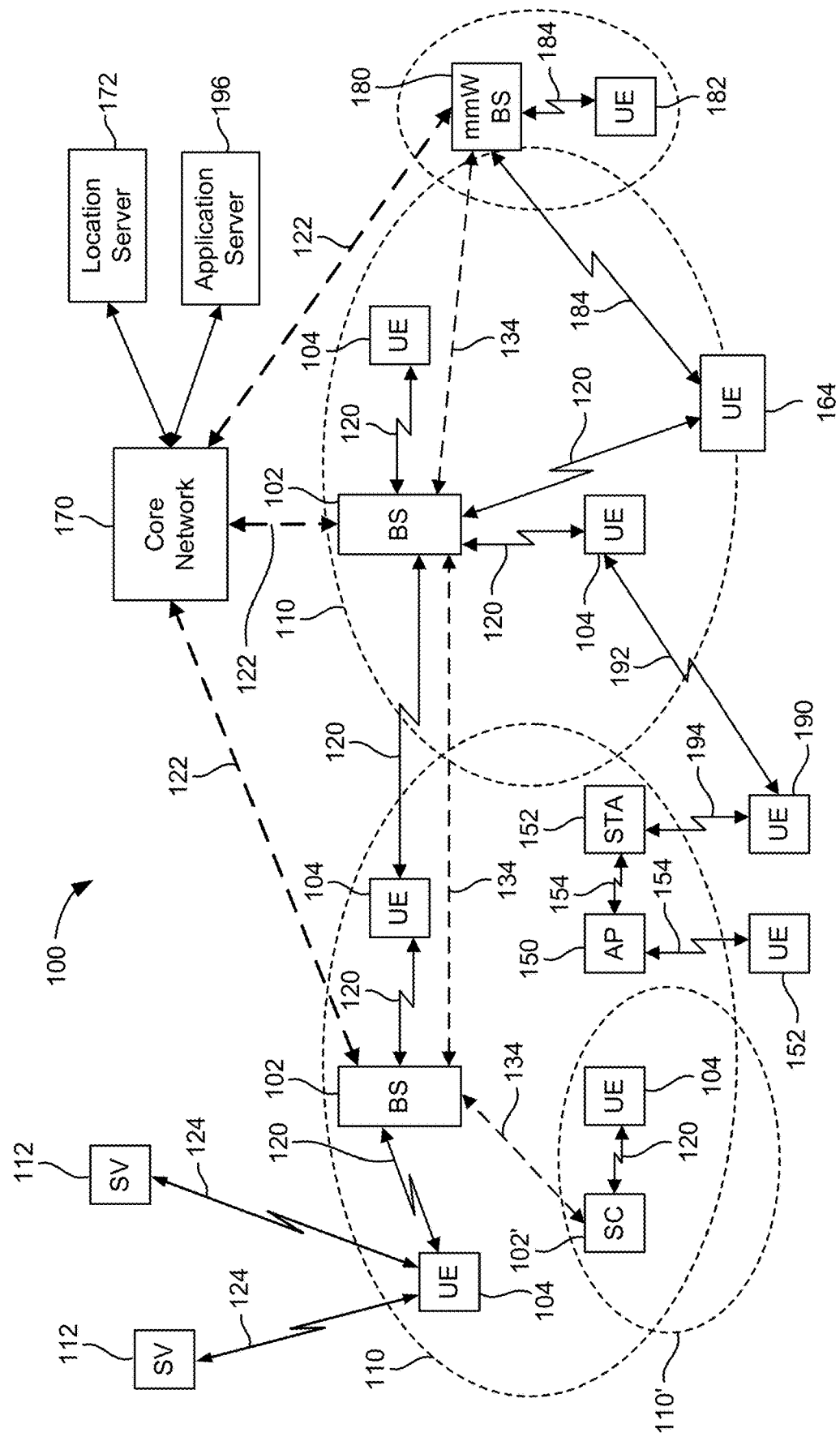
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage, or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell (SC) base station 102' may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen-before-talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a target reference RF signal on a target beam can be derived from information about a source reference RF signal on a source beam. If the source reference RF signal is QCL Type A, the receiver can use the source reference RF signal to estimate the Doppler shift, Doppler spread, average delay, and delay spread of a target reference RF signal transmitted on the same channel. If the source reference RF signal is QCL Type B, the receiver can use the source reference RF signal to estimate the Doppler shift and Doppler spread of a target reference RF signal transmitted on the same channel. If the source reference RF signal is QCL Type C, the receiver can use the source reference RF signal to estimate the Doppler shift and average delay of a target reference RF signal transmitted on the same channel. If the source reference RF signal is QCL Type D, the receiver can use the source reference RF signal to estimate the spatial receive parameter of a target reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (between FR1 and FR2) and FR4 (above 52600 MHz). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In the example of FIG. 1, one or more Earth orbiting satellite positioning system (SPS) space vehicles (SVs) 112 (e.g., satellites) may be used as an independent source of location information for any of the illustrated UEs (shown in FIG. 1 as a single UE 104 for simplicity). A UE 104 may include one or more dedicated SPS receivers specifically designed to receive SPS signals 124 for deriving geo location information from the SVs 112. An SPS typically includes a system of transmitters (e.g., SVs 112) positioned to enable receivers (e.g., UEs 104) to determine their location on or above the Earth based, at least in part, on signals (e.g., SPS signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104.

The use of SPS signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, an SPS may include any combination of one or more global and/or regional navigation satellite systems and/or augmentation systems, and SPS signals 124 may include SPS, SPS-like, and/or other signals associated with such one or more SPS.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on. The wireless communication system 100 may include or communicate with one or more application servers 196.

Figure 2A:
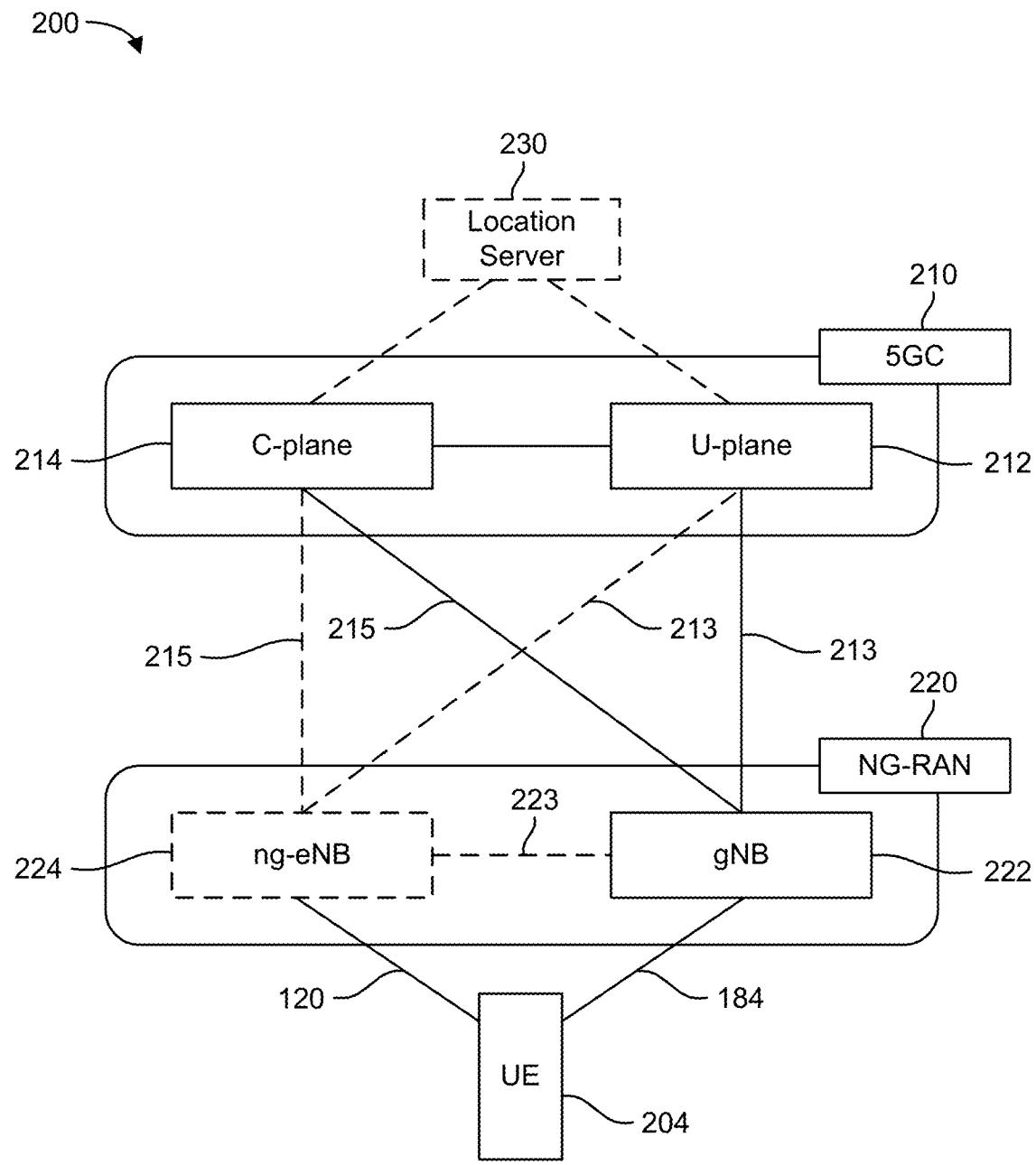
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network.

Figure 2B:
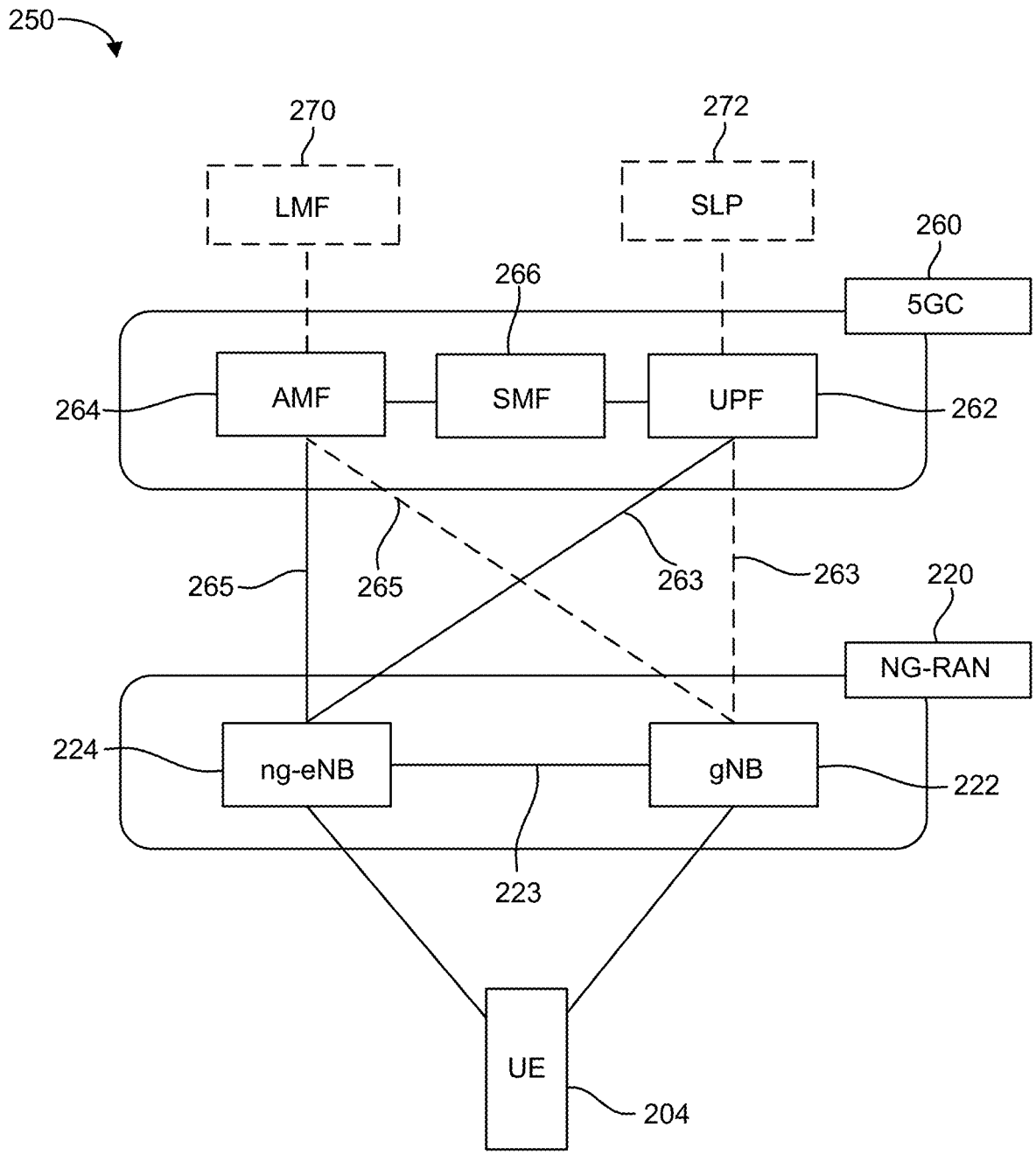

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the NG-RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the NG-RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and an LMF 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

Figure 3A:
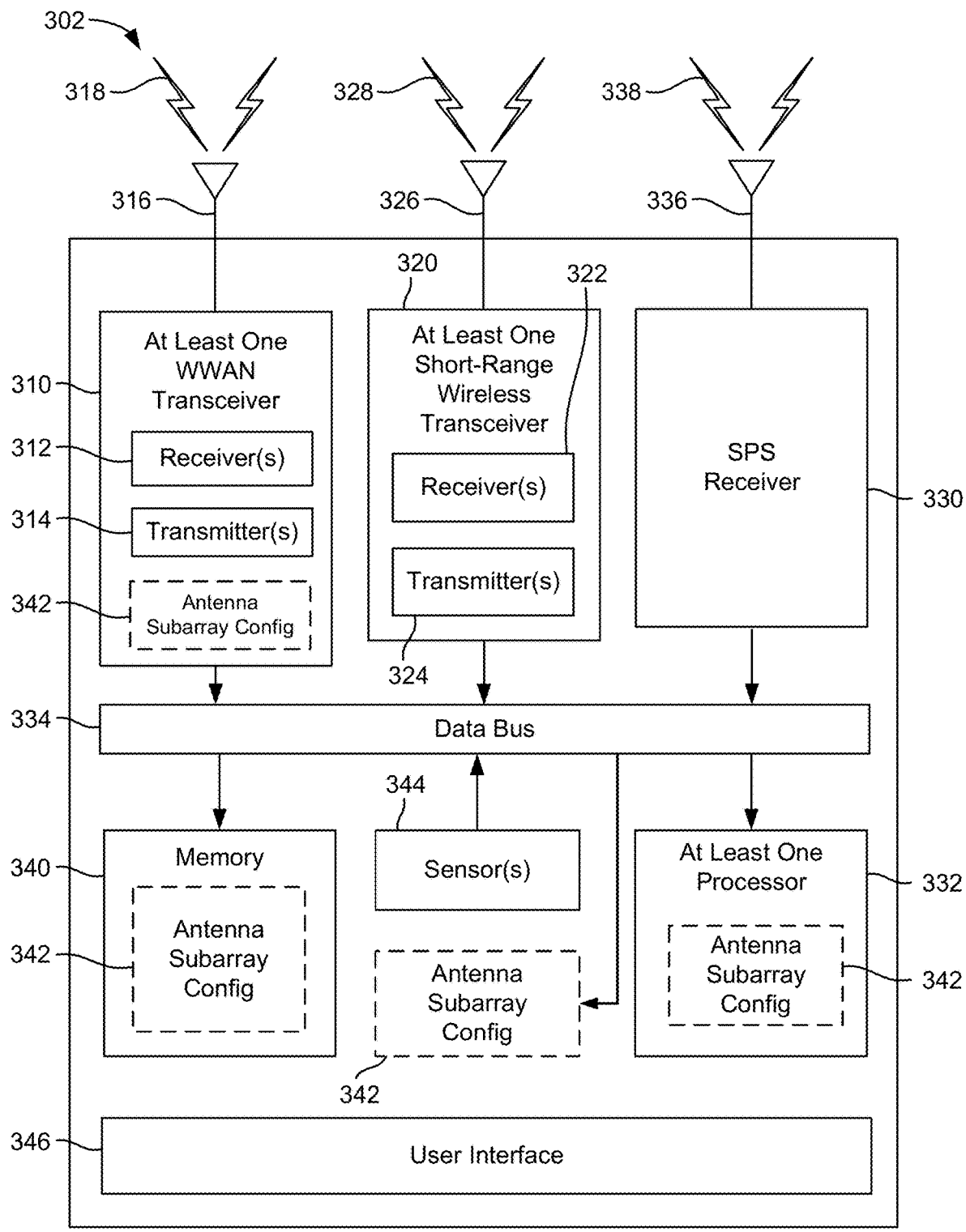
FIGS. 3A to 3C are simplified block diagrams of several sample aspects of components that may be employed in a user equipment (UE), a base station, and a network entity, respectively, and configured to support communications as taught herein.
Figure 3B:
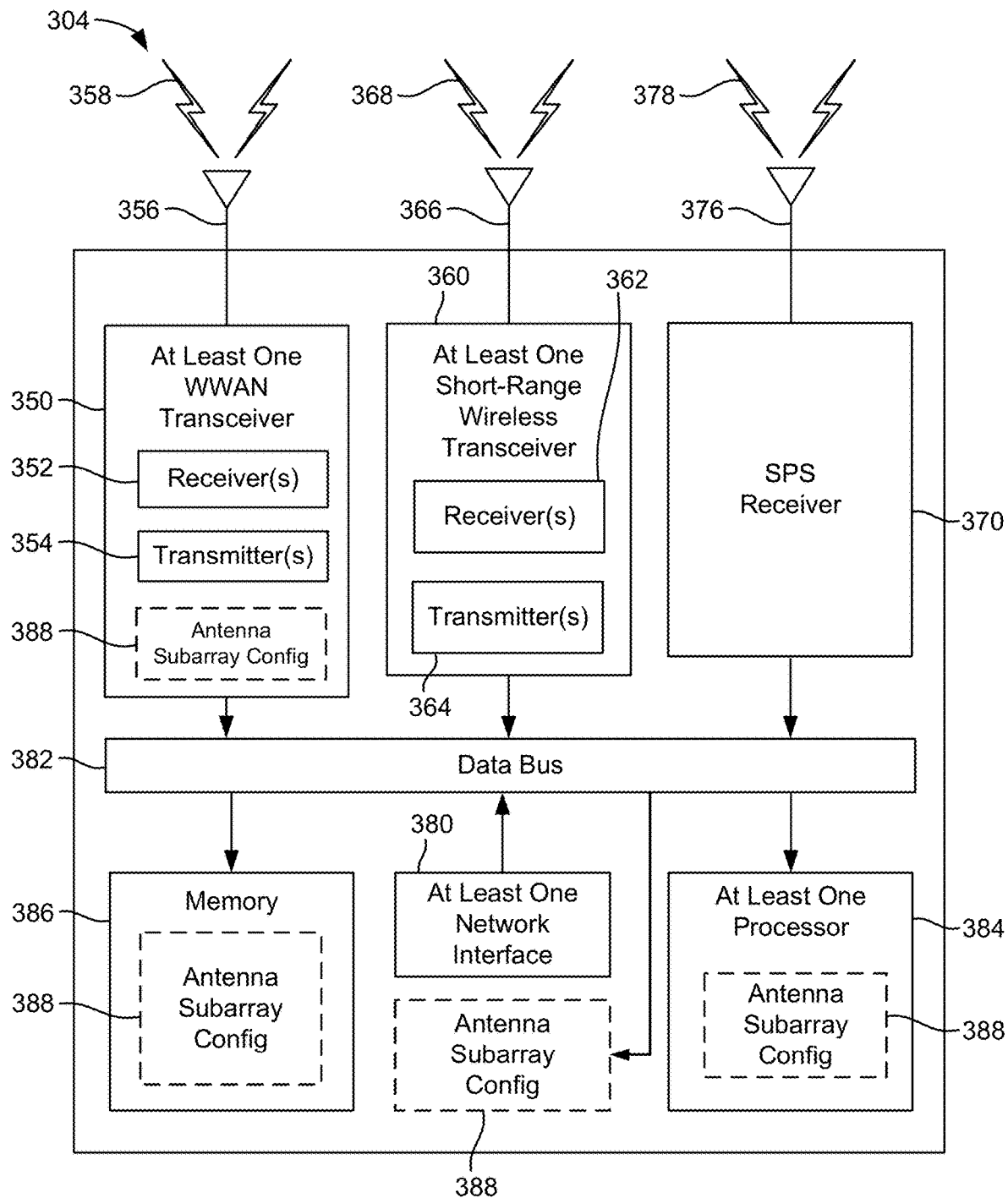
Figure 3C:
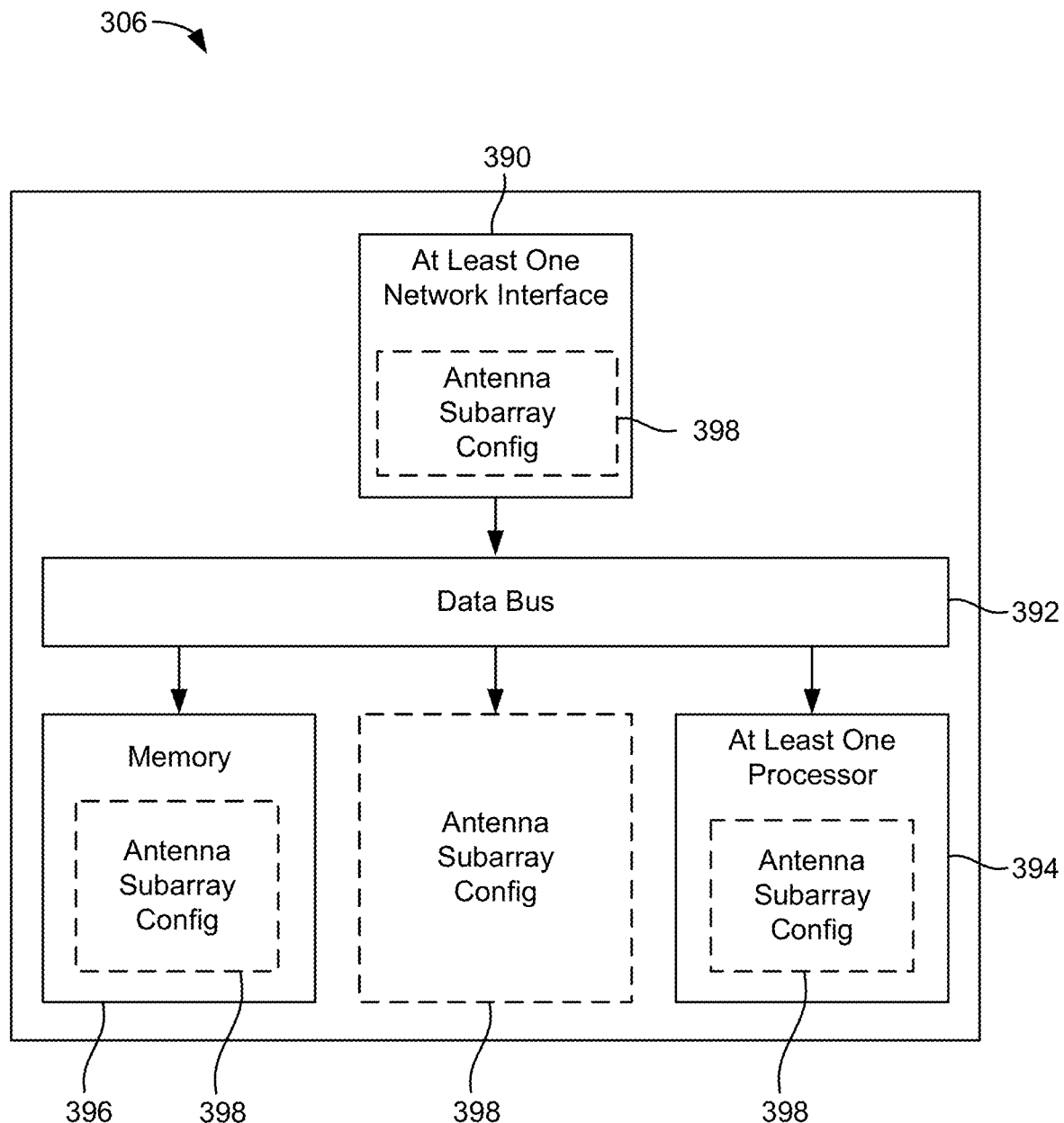

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include at least one wireless wide area network (WWAN) transceiver 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may be connected to one or more antennas or arrays of antenna elements 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, at least one short-range wireless transceiver 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device (e.g., one or both of the transceivers 310 and 320 and/or 350 and 360) of the UE 302 and/or the base station 304 may also comprise a network listen module (NLM) or the like for performing various measurements.

The UE 302 and the base station 304 also include, at least in some cases, satellite positioning systems (SPS) receivers 330 and 370. The SPS receivers 330 and 370 may be connected to one or more antennas 336 and 376, respectively, and may provide means for receiving and/or measuring SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine positions of the UE 302 and the base station 304 using measurements obtained by any suitable SPS algorithm.

The base station 304 and the network entity 306 each include at least one network interface 380 and 390, respectively, providing means for communicating (e.g., means for transmitting, means for receiving, etc.) with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

In an aspect, the at least one WWAN transceiver 310 and/or the at least one short-range wireless transceiver 320 may form a (wireless) communication interface of the UE 302. Similarly, the at least one WWAN transceiver 350, the at least one short-range wireless transceiver 360, and/or the at least one network interface 380 may form a (wireless) communication interface of the base station 304. Likewise, the at least one network interface 390 may form a (wireless) communication interface of the network entity 306. The various wireless transceivers (e.g., transceivers 310, 320, 350, and 360) and wired transceivers (e.g., network interfaces 380 and 390) may generally be characterized as at least one transceiver, or alternatively, as at least one communication interface. As such, whether a particular transceiver or communication interface relates to a wired or wireless transceiver or communication interface, respectively, may be inferred from the type of communication performed (e.g., a backhaul communication between network devices or servers will generally relate to signaling via at least one wired transceiver).

The UE 302, the base station 304, and the network entity 306 also include other components that may be used in conjunction with the operations as disclosed herein. The UE 302, the base station 304, and the network entity 306 include at least one processor 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, at least one general purpose processor, multi-core processor, central processing unit (CPU), ASIC, digital signal processor (DSP), field programmable gate array (FPGA), other programmable logic devices or processing circuitry, or various combinations thereof.

The UE 302, the base station 304, and the network entity 306 include memory circuitry implementing memory components 340, 386, and 396 (e.g., each including a memory device), respectively, for maintaining information (e.g., information indicative of reserved resources, thresholds, parameters, and so on). The memory components 340, 386, and 396 may therefore provide means for storing, means for retrieving, means for maintaining, etc. In some cases, the UE 302, the base station 304, and the network entity 306 may include antenna subarray configuration modules 342, 388, and 398, respectively. The antenna subarray configuration modules 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the antenna subarray configuration modules 342, 388, and 398 may be external to the processors 332, 384, and 394 (e.g., part of a modem processing system, integrated with another processing system, etc.). Alternatively, the antenna subarray configuration modules 342, 388, and 398 may be memory modules stored in the memory components 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the antenna subarray configuration module 342, which may be, for example, part of the at least one WWAN transceiver 310, the memory component 340, the at least one processor 332, or any combination thereof, or may be a standalone component. FIG. 3B illustrates possible locations of the antenna subarray configuration module 388, which may be, for example, part of the at least one WWAN transceiver 350, the memory component 386, the at least one processor 384, or any combination thereof, or may be a standalone component. FIG. 3C illustrates possible locations of the antenna subarray configuration module 398, which may be, for example, part of the at least one network interface 390, the memory component 396, the at least one processor 394, or any combination thereof, or may be a standalone component.

The UE 302 may include one or more sensors 344 coupled to the at least one processor 332 to provide means for sensing or detecting movement and/or orientation information that is independent of motion data derived from signals received by the at least one WWAN transceiver 310, the at least one short-range wireless transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the at least one processor 384 in more detail, in the downlink, IP packets from the network entity 306 may be provided to the at least one processor 384. The at least one processor 384 may implement functionality for an RRC layer, a packet data convergence protocol (PDCP) layer, a radio link control (RLC) layer, and a medium access control (MAC) layer. The at least one processor 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the at least one processor 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the at least one processor 332, which implements Layer-3 (L3) and Layer-2 (L2) functionality.

In the uplink, the at least one processor 332 provides demultiplexing between transport and logical channels, packet reassembly, deciphering, header decompression, and control signal processing to recover IP packets from the core network. The at least one processor 332 is also responsible for error detection.

Similar to the functionality described in connection with the downlink transmission by the base station 304, the at least one processor 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARM), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the at least one processor 384.

In the uplink, the at least one processor 384 provides demultiplexing between transport and logical channels, packet reassembly, deciphering, header decompression, control signal processing to recover IP packets from the UE 302. IP packets from the at least one processor 384 may be provided to the core network. The at least one processor 384 is also responsible for error detection.

For convenience, the UE 302, the base station 304, and/or the network entity 306 are shown in FIGS. 3A to 3C as including various components that may be configured according to the various examples described herein. It will be appreciated, however, that the illustrated components may have different functionality in different designs.

The various components of the UE 302, the base station 304, and the network entity 306 may communicate with each other over data buses 334, 382, and 392, respectively. In an aspect, the data buses 334, 382, and 392 may form, or be part of, the communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A to 3C may be implemented in various ways. In some implementations, the components of FIGS. 3A to 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memory components 340, 386, and 396, the antenna subarray configuration modules 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Commercial implementations of millimeter wave (mmW) systems are available in the market, and the next generation of mmW systems will cover a wider range (e.g., FR4, which spans 52.6 GHz to 114.25 GHz), with a larger number antenna elements that can be deployed over the same aperture as currently used by the first generation of mmW systems. For example, an 8×2 antenna array at 60 GHz can fit into the same aperture as a 4×1 antenna array at 30 GHz. However, using all 16 antenna elements of the 8×2 array can lead to high power consumption and associated thermal overhead. Thus, except for scenarios which require peak performance, it is beneficial to use a subset of the available antenna elements, which reduces battery consumption and produces less heat compared to using all the available antenna elements.

Figure 4A:
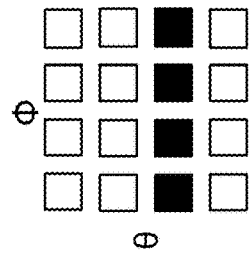
FIGS. 4A and 4B illustrate examples of beam patterns produced by using different subsets of antennas from a 4×4 array.
Figure 4A:
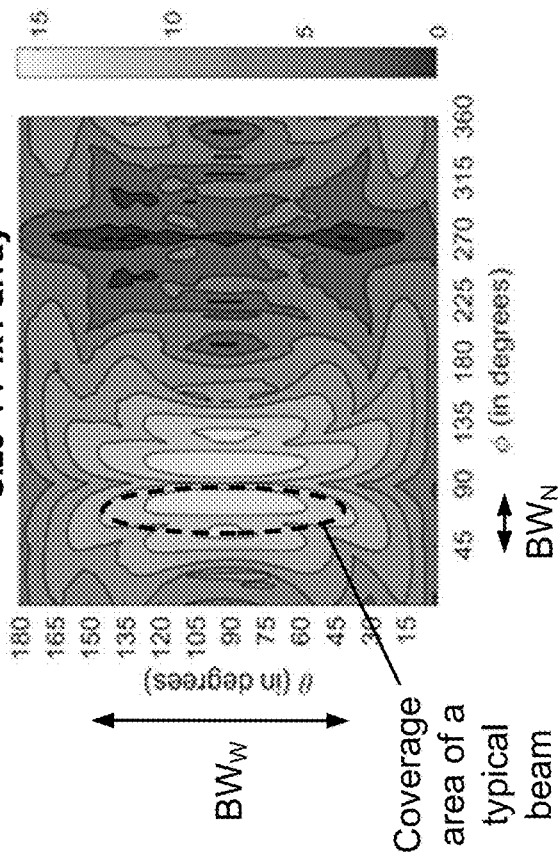
Figure 4B:
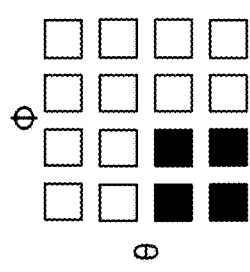
Figure 4B:
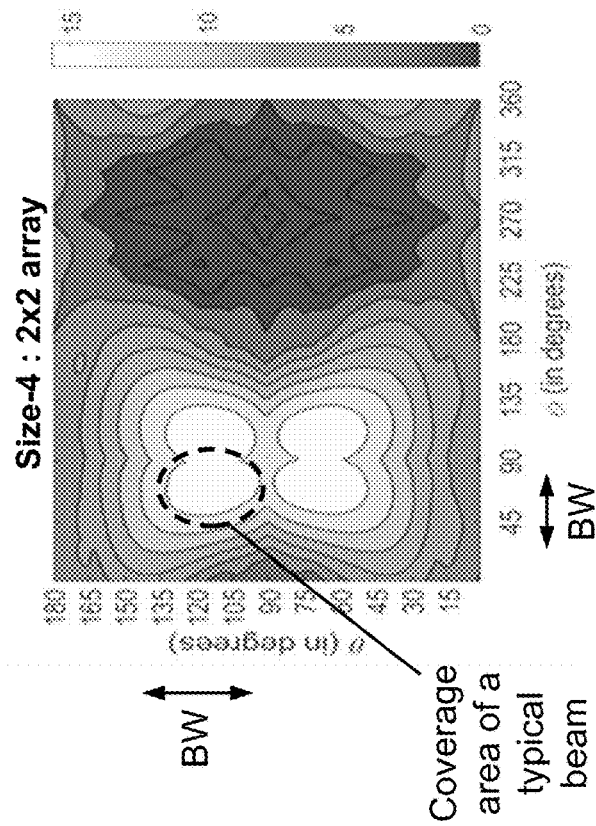

FIGS. 4A and 4B illustrate examples of beam patterns produced by using different subsets of antennas from a 4×4 array. In these figures, the 16 antenna elements in the 4×4 array are represented by 16 boxes, with selected/active elements shown as black-filled boxes. In FIG. 4A, the 2×2 subset of antenna elements shown in the top portion of FIG. 4A produces the spherical coverage plot (array gain over a sphere) in the bottom portion of FIG. 4A. The beam pattern graphs display array gain as a function of azimuth angle $\phi$ and elevation angle $\theta$ corresponding to a certain orientation of the antenna array. In FIG. 4B, the 4×1 subset of antenna elements shown in the top portion of FIG. 4B produces the spherical coverage plot in the bottom portion of FIG. 4B. Both plots presume a boresight along the Y axis with size-4 analog beamforming codebooks where each beam steers energy in a specific direction over the coverage region of the antenna array under consideration.

The two different four-element subsets consume the same amount of power and have similar thermal overheads, but they have different beamforming properties, e.g., beamwidths. The dashed ovals in the beam pattern graphs indicate the coverage area of a typical beam in each configuration. Beams produced by the 4×1 array have a narrow beamwidth ($BW_N$) in one dimension and a wider beamwidth ($BW_W$) in the other dimension, while beams produced by a 2×2 array are symmetric with a beamwidth BW, where $BW_N<BW<BW_W$. A 4×1 array provides a $BW_N$ of about 25 degrees and a 2×2 array provides a BW of about 50 degrees.

In some circumstances, the 2×2 array beam pattern may be more desirable, and in other circumstances, the 4×1 array beam pattern may be more desirable. The beamwidth of the beam determines the angular resolution of an angular positioning measurement (e.g., AoA, AoD, etc.) that is using that beam: a narrow beam provides better angular resolution than a wide beam, but a wide beam potentially reaches a larger number of receiving devices. Thus, in the context of positioning, a beam's beamwidth determines the localization accuracy. Presuming that ϕ is azimuth and θ is elevation, the 4×1 subarray will give better azimuth resolution but worse elevation resolution. In the example where the UE is in a building, the 2×2 subarray may be preferred because it has a better elevation resolution at the expense of azimuth resolution and thus may be able to better determine on which floor the UE is located, or better focus transmission to a UE on a particular floor, etc. In the example where the UE is within a moving vehicle, the 4×1 subarray may be preferred because it provides better azimuth resolution at the expense of elevation resolution, which may be important for determining the position or location of the vehicle on the road, the location of pedestrians, etc.

Figure 5:
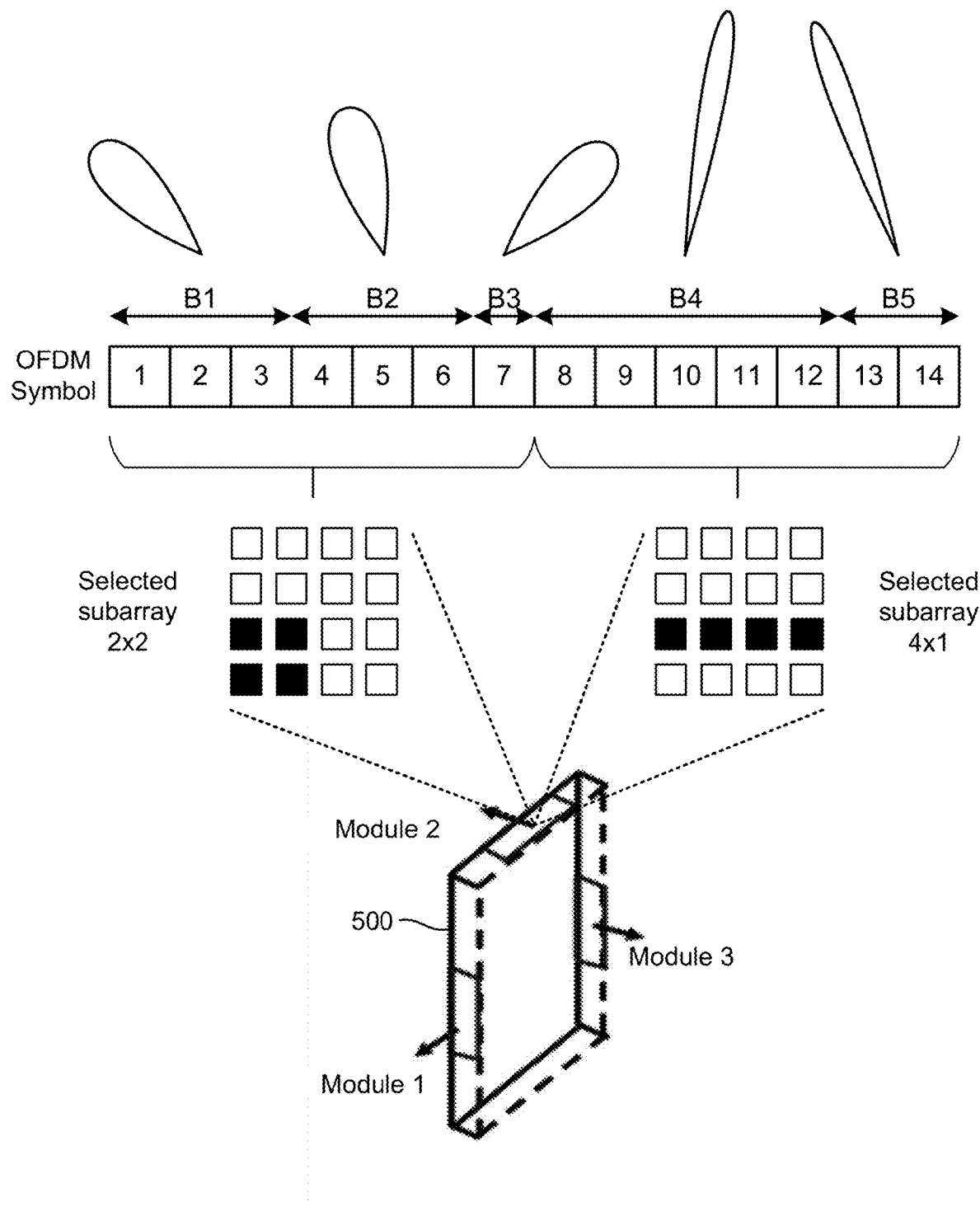
FIG. 5 illustrates the use of different subarrays for different purposes according to some aspects of the disclosure.

FIG. 5 illustrates the use of different subarrays for different purposes according to some aspects of the present disclosure. In FIG. 5, a device 500, which may be a UE, includes three modules, each on a different edge of the device, each module containing a 4×4 array of antenna elements. In the example illustrated in FIG. 5, in one slot having fourteen OFDM symbols, module 2 may use a 2×2 subarray configuration for the first seven symbols and a 4×1 subarray configuration for the last seven symbols. As further shown in the example illustrated in FIG. 5, the 2×2 subarray configuration and the 4×1 subarray configuration transmit different beams during different symbol intervals. In FIG. 5, the 2×2 subarray configuration transmits beam B1 during symbols 1-3, beam B2 during symbols 4-6, and beam B3 during symbol 7; the 4×1 subarray configuration transmits beam B4 during symbols 8-12 and beam B5 during symbols 13 and 14.

The beams produced by one subarray configuration may have different characteristics than the beams produced by another subarray configuration. For example, the narrower beams B4 and B5 produced by the 4×1 subarray may provide better positioning accuracy, while the wider beams B1, B2, and B3 may produce a better data rate. Thus, in one example, the UE 500 transmits data during OFDM symbols 1-7 and transmits positioning signals during OFDM symbols 8-14. In some aspects, a location management function (LMF) may provide the UE 500 with positioning requirements or parameters, and, based on those inputs, the UE 500 may select the 4×1 subarray for performing positioning tasks. It is noted that the 2×2 and 4×1 subarray configurations are illustrative and not limiting. A subarray configuration can comprise any subset of antenna elements, including any number of antenna elements and antenna elements arranged in any pattern supported by the physical antenna array.

Different array configurations lead to different localization accuracies which may or may not meet the positioning requirements. Thus, it is desired that a device be able to select a preferred subarray configuration for positioning applications based on the beamforming properties, in order to meet positioning requirements which can be dynamically indicated. Current standards allow static positioning accuracy requirements for azimuth and elevation to be separately specified for the gNB, but not for a UE. Moreover, current standards do not define any mechanism for dynamically changing positioning accuracy requirements or measurement accuracy requirements, i.e., there is no mechanism for one device to notify another device of a dynamically changing positioning accuracy requirement or measurement accuracy requirement so that a suitable subarray configuration may be selected to address a dynamically changing environment, for example.

To address this technical challenge, techniques for preferred subarray indication for positioning are herein presented, including techniques for communicating accuracy requirements. Based on such dynamic indications, a UE or other device can make decisions about which subarray(s) to use, including using different subarrays for different purposes, e.g., using one subarray for positioning and using another subarray for data communication.

Figure 6:
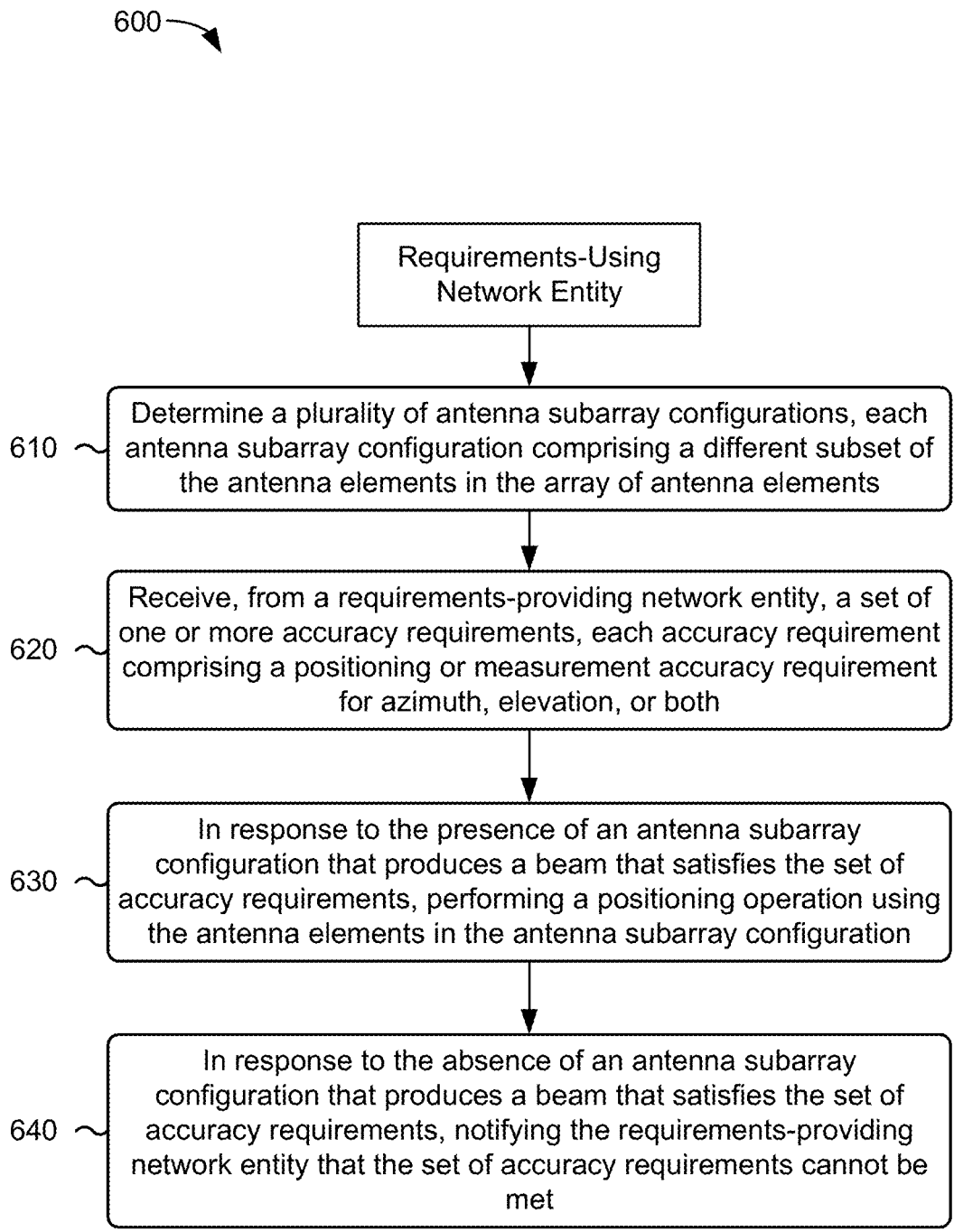
FIG. 6 is a flowchart of an example process associated with accuracy requirements and preferred subarray indication for positioning according to some aspects of the disclosure.

FIG. 6 is a flowchart of an example process 600 associated with dynamic (e.g., dynamically changed or dynamically changing) accuracy requirements and preferred subarray indication for positioning. In some aspects, one or more process blocks of FIG. 6 may be performed by a requirements-using network entity (e.g., a UE 104, a base station 102, a UE 104, a customer premises equipment (CPE), an intelligent reflecting surface (IRS), a repeater node, or an integrated access and backhaul (IAB) node, etc.). In some aspects, one or more process blocks of FIG. 6 may be performed by another device or a group of devices separate from or including the requirements-using network entity. Additionally, or alternatively, one or more process blocks of FIG. 6 may be performed by one or more components of device 302 or device 304, such as: the at least one processor 332 or 384; the memory 340 or 386; the at least one WWAN transceiver 310 or 350; the at least one short-range wireless transceiver 320 or 350; the SPS receiver 330 or 360; the antenna subarray configuration module(s) 342 or 388; the user interface 346; and/or the at least one network interface 380; any or all of which may be considered means for performing this operation.

As shown in FIG. 6, process 600 may include determining a plurality of antenna subarray configurations, each antenna subarray configuration comprising a different subset of the antenna elements in the array of antenna elements (block 610). Means for performing the operation at block 610 may include the at least one processor 332 of device 302, the at least one processor 384 of device 304, or the at least one processor 394 of device 306. For example, where device 302 is a UE, the at least one processor 332 of the UE 302 may read a table that contains the available antenna subarray configurations, and that may also contain information associated with each subarray configuration, such as angular resolution in azimuth, elevation, or both, or other information related to measurement accuracy or positioning accuracy.

As further shown in FIG. 6, process 600 may include receiving, from a requirements-providing network entity, a set of one or more accuracy requirements, each accuracy requirement comprising a positioning accuracy requirement or measurement accuracy requirement, and each accuracy requirement specific an accuracy requirement for azimuth, elevation, or both. (block 620). In some aspects, the positioning accuracy requirement comprises an accuracy in degrees. In some aspects, the measurement accuracy requirement comprises an accuracy in decibels. Means for performing the operation at block 620 may include the at least one WWAN transceiver 310 of device 302, the at least one WWAN transceiver 350 of device 304, or the at least one network interface 380 of device 304. Continuing the example where device 302 is a UE, the receiver(s) 312 of device 302 may receive the set of accuracy requirements from an LMF 270. In some aspects, the set of one or more accuracy requirements may be received in response to a request for accuracy requirements, sent by the requirements-using network entity to the requirements-providing network entity, but in other aspects, the set of accuracy requirements are received in the absence of a request for accuracy requirements. In some aspects, an application executing within a UE 104 and communicating with an application server 196 may indicate to the application server 196 that the application needs a more accurate estimate of the UE's current location or position. The application server 196 may send, to a location server 172, a request for an accurate estimation of the UE's current location, and, in response to that request, the location server 172 may send updated accuracy requirements to the UE 104.

As further shown in FIG. 6, process 600 may include, in response to the presence of an antenna subarray configuration that produces a beam that satisfies the set of accuracy requirements, performing a positioning operation using the antenna elements in the antenna subarray configuration (block 630). Means for performing the operation at block 630 may include the at least one processor 332 of device 302 or the at least one processor 384 of device 304. Continuing the example where device 302 is a UE, the at least one processor 332 may determine that one of the available antenna subarray configurations satisfies a positioning accuracy requirement, and that using that antenna subarray configuration does not exceed a power consumption budget or a thermal operation limit.

As further shown in FIG. 6, process 600 may include, in response to the absence of an antenna subarray configuration that produces a beam that satisfies the set of accuracy requirements, notifying the requirements-providing network entity that the set of accuracy requirements cannot be met (block 640). Means for performing the operation at block 640 may include the at least one processor 332 of device 302 or the at least one processor 384 of device 304. Continuing the example where device 302 is a UE, the at least one processor 332 may determine that none of the available antenna subarray configurations satisfies a dynamic positioning accuracy requirement. In some aspects, there may be an available antenna subarray configuration that satisfies the positioning accuracy requirements but using that antenna subarray configuration would exceed a thermal limit or using that antenna subarray configuration requires more battery power than the UE currently has. In some aspects, the device 302 may not only notify the requirements-providing network entity that the set of accuracy requirements cannot be met, the device 302 may also tell the requirements-providing network entity what accuracy requirements it can meet.

Process 600 may include additional aspects, such as any single aspect or any combination of aspects described below and/or in connection with one or more other processes described elsewhere herein. Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

In some aspects, accuracy requirements may include positioning accuracy requirements, measurement accuracy requirements, or both. The accuracy requirements may be defined for multiple axes or orientations, such as azimuth and elevation. Position accuracy may be specified as precision in terms of degrees and measurement accuracy may be specified as power in terms of decibels (dBs). For example:

A UE may ask for better requirements (e.g., an application may require additional precision in terms of positioning).

An LMF may want more accurate positioning.

An LMF may want higher data rate instead of more accurate positioning.

In some aspects, a network entity, such as a base station (BS), such as a gNodeB (gNB), a location server, such as a location management function (LMF), an application server, or other entity, may provide such requirements to a UE, and the UE may select a subarray configuration that satisfies these requirements. For example:

A gNB can signal dynamically changing requirements to UE or other devices in the network in a cellular access setting.

A UE can request specific accuracy requirements from an LMF (e.g., for UE-assisted positioning) and the LMF can provide this assistance information.

One UE can signal requirements to another UE/device in a sidelink setting.

Dynamic requirements can come from a network server (e.g., an application server such as when a user opens an application on their mobile phone), and that application has specific accuracy requirements; the application or application server may then communicate the requirements to the network server, which informs the gNB or UE.

In response to this signaling, a UE or gNB can select a particular antenna subarray configuration to meet (or attempt to meet) the dynamically changing accuracy requirements. In some aspects, such as where multiple antenna subarray configurations satisfy the accuracy requirements, the antenna subarray configuration may be further selected based on power-thermal profiles, e.g., to not exceed a certain power threshold, thermal threshold, or both.

In some aspects, the base station or location server may change the accuracy requirements. For example, if a UE or other device is moving in a downtown setting, precise location estimation may be infeasible due to the presence of high-rise buildings and clutter in the environment. Thus, the device could be signaled that precise position requirements may not be necessary. In response to this signaling, the device could change the antenna subarray configuration to meet the new positioning accuracy requirements. Likewise, a device could be signaled that a higher positioning accuracy is now required, or required in a different orientation, and in response the device could select a new antenna subarray configuration.

In some aspects, the UE can trigger a change of accuracy requirements. For example, an application hosted by the UE may request or require additional positioning accuracy.

At the gNB side, azimuth and elevation easily map to the coordinate system since the gNB is typically stationary. For example, if azimuth positioning accuracy is mandated to be high (good accuracy) at the gNB side, a horizontal 4×1 subarray is a better choice than a 2×2 subarray. On the other hand, if elevation positioning accuracy is mandated to be high (good accuracy) at the gNB side, a 2×2 subarray is a better choice than a 4×1 subarray.

At the UE side, azimuth and elevation accuracy may be in a global coordinate system and the local coordinate system (orientation of the UE) may not be matched to it. This could be because of UE rotation or movements. Thus, depending on UE orientation modalities, certain subarray structures may be preferred over other structures. For example, where high accuracy is mandated in a particular orientation, the UE may try either a 4×1 subarray configuration or a 1×4 subarray configuration, depending on the particular orientation of the UE at the time. Likewise, the UE could try a series of subarray configurations until it finds one that meets the accuracy requirements, or else determines that it cannot meet those requirements.

When a device determines that it cannot meet the accuracy requirements, there are various ways that the device could respond. For example, in some aspects, if the device cannot meet the positioning and/or measurement accuracy requirements without changing subarrays (loss of data rate, loss of reliability, etc.), then the device feeds back a "failure to meet positioning and measurement accuracy requirement" indication and possible positioning accuracies that can be actually met. In some aspects, the device may indicate that it can meet the accuracy but would exceed a thermal or power limit, or that it can meet the accuracy but only for a limited time.

In one example, a UE may report positioning measurements or other measurements to a location server, and the location server may determine that the accuracy of the measurements is insufficient and either provide the UE with positioning key performance indicators (KPIs) or requirements and let the UE select an appropriate subarray configuration, or request the UE to use or select a specific subarray configuration.

Figure 7:
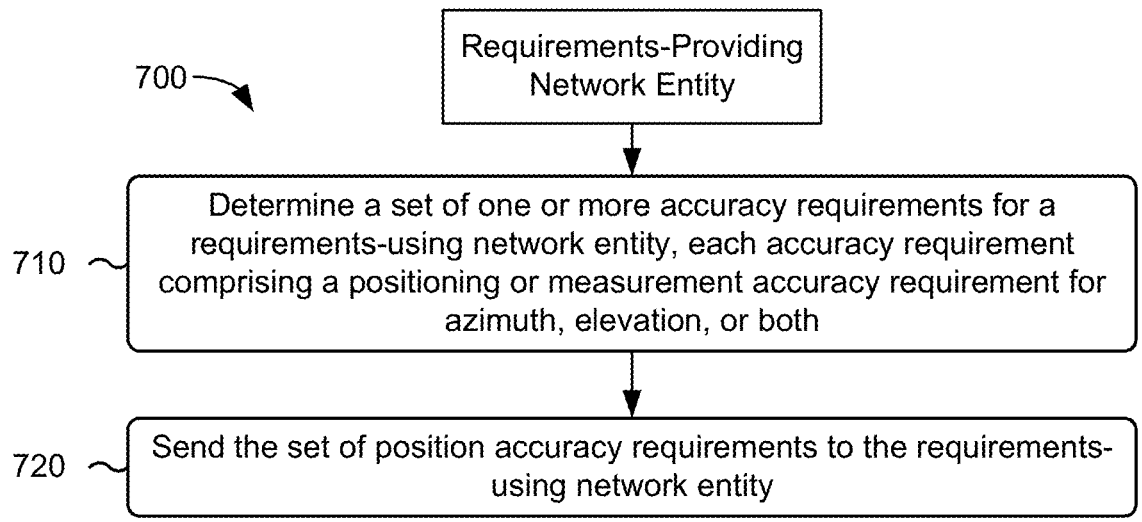
FIG. 7 is a flowchart of an example process associated with accuracy requirements and preferred subarray indication for positioning according to some aspects of the disclosure.

FIG. 7 is a flowchart of an example process 700 associated with dynamic accuracy requirements and preferred subarray indication for positioning. In some aspects, one or more process blocks of FIG. 7 may be performed by a requirements-providing network entity (e.g., a location server 172, a base station 102, an LMF 270, etc.). In some aspects, one or more process blocks of FIG. 7 may be performed by another device or a group of devices separate from or including the requirements-providing network entity. Additionally, or alternatively, one or more process blocks of FIG. 7 may be performed by one or more components of device 304 or device 306, such as: the at least one processor 384, or 394; the memory 386, or 396, the at least one WWAN transceiver 350; the at least one short-range wireless transceiver 350; the 360; the antenna subarray configuration module(s) 388, or 398; and/or the at least one network interface 380 or 390; any or all of which may be considered means for performing this operation.

As shown in FIG. 7, process 700 may include determining a set of one or more accuracy requirements for a requirements-using network entity, each accuracy requirement comprising a positioning accuracy requirement or a measurement accuracy requirement for azimuth, elevation, or both (block 710). Means for performing the operation at block 710 may include the at least one processor 384 or 394. For example, a location server 172 may determine that a UE 104 is in an area with many buildings or other sources of multipath reflection, in which case a requirement for high positioning accuracy is infeasible, or onerous from a processing or power consumption standpoint, in which case new, less strict accuracy requirements are selected for the UE 104, such as to relax the positioning accuracy. In another example, a location server 172 may determine that a UE 104 is somewhere within a high-rise building, in which case the azimuth accuracy requirements for a base station 102 serving that UE 104 may be relaxed in favor of increased elevation accuracy requirements, so that the base station 102 can direct the beam towards the correct floor of the building. In this example, an antenna configuration that produces a beam having an azimuth angle of 15 degrees and an elevation angle of 30 degrees may be changed to an antenna configuration that produces a beam having an azimuth angle of 30 degrees and an elevation angle of 15 degrees, e.g., to target fewer floors of the high-rise building. These examples are illustrative and are not limiting. Positioning accuracy, measurement accuracy, or both may be dynamically adjusted to increase or decrease accuracy in azimuth and elevation independently of each other.

As further shown in FIG. 7, process 700 may include sending the set of position accuracy requirements to the requirements-using network entity (block 730). Means for performing the operation at block 730 may include the at least one processor 384 or 394, the at least one network interface 380 or 390, and the at least one WWAN transceiver 350. For example, A location server 172 may send the set of position accuracy requirements to the base station 102 via at least one network interfaces 380 and 390, and the base station 102 may forward the set of position accuracy requirements to the UE 104 via the at least one WWAN transceivers 350 and 360. In some aspects, the set of one or more accuracy requirements may be sent to the requirements-using network entity in response to receiving a request for accuracy requirements from the requirements-using network entity, but in other aspects, the set of accuracy requirements may be sent in the absence of such a request from the requirements-using network entity.

Process 700 may include additional aspects, such as any single aspect or any combination of aspects described below and/or in connection with one or more other processes described elsewhere herein. Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
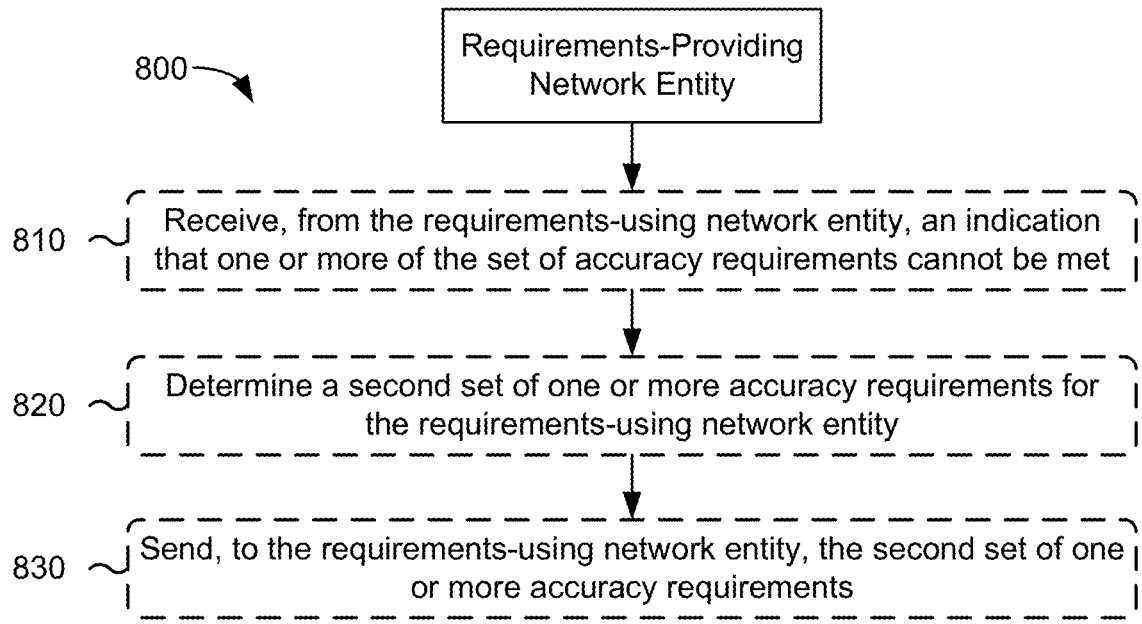
FIG. 8 is a flowchart of an example process associated with accuracy requirements and preferred subarray indication for positioning according to some aspects of the disclosure.

FIG. 8 is a flowchart of an example process 800 associated with dynamic accuracy requirements and preferred subarray indication for positioning, optionally performed by the requirements-providing network entity after block 720 of FIG. 7. As shown in FIG. 8, process 800 may include receiving, from the requirements-using network entity, an indication that one or more of the set of accuracy requirements cannot be met (optional block 810). Means for performing the operation at block 810 may include the at least one WWAN transceiver 350 or the at least one network interface 380 or 390. In some aspects, the notification that the set of accuracy requirements cannot be met indicates positioning or measurement accuracy requirements that cannot be met by the requirements-using network entity, positioning or measurement accuracy requirements that can be met by the requirements-using network entity, or combinations thereof.

As further shown in FIG. 8, process 800 may include determining, based on the positioning or measurement accuracy requirements that can be met, a second set of one or more accuracy requirements for the requirements-using network entity (optional block 820). Means for performing the operation at block 820 may include the at least one processor 384 or 394. For example, where the network node 306 is a location server 172, the at least one processor 394 may adjust one or more of the accuracy requirements defined in the first set to produce the modified second set, e.g., based on the feedback from the UE 104 regarding what accuracy requirements that the UE 104 can meet.

As further shown in FIG. 8, process 800 may include sending the second set of accuracy requirements to the requirements-using network entity (optional block 830). Means for performing the operation at block 830 may include the at least one processor 384 or 394, the at least one network interface 380 or 390, and the at least one WWAN transceiver 350. For example, where the network node 306 is a location server 172, it may send the second set of accuracy requirements to the base station 102 via the network interfaces 380 and 390, and the base station 102 may send the second set of accuracy requirements to the UE 104 via the WWAN transceivers 310 and 350.

Process 800 may include additional aspects, such as any single aspect or any combination of aspects described below and/or in connection with one or more other processes described elsewhere herein. Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

As will be appreciated, a technical advantage of the methods and techniques presented herein include the ability for a UE or other device to receive accuracy requirements, and in response to receiving these accuracy requirements, the UE can make decisions about which antenna subarray configuration to use, including using different subarrays for different purposes, e.g., using one subarray for positioning and using another subarray for data communication. From the network standpoint, the methods and techniques presented herein provide a mechanism by which a network node can dynamically adjust the accuracy requirements of a UE, e.g., in response to changing environmental conditions, in response to a specific request by the UE, in response to a specific request by an application server with which the UE is communicating, or for other reasons.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

In an aspect, a requirements-using network entity includes means for determining a plurality of antenna subarray configurations, each antenna subarray configuration comprising a different subset of the antenna elements in the array of antenna elements; means for receiving, from a requirements-providing network entity, a set of one or more accuracy requirements, each accuracy requirement comprising a positioning accuracy requirement or a measurement accuracy requirement for azimuth, elevation, or both; means for performing a positioning operation using the antenna elements in the antenna subarray configuration that produces a beam that satisfies the set of one or more accuracy requirements; and means for notifying the requirements-providing network entity that the set of one or more accuracy requirements cannot be met. In some aspects, the means for notifying the requirements-providing network entity that the set of one or more accuracy requirements cannot be met further comprises means for indicating, to the requirements-providing network entity, positioning accuracy requirements that can be met, or measurement accuracy requirements that can be met, or a combination thereof. In some aspects, the requirements-using network entity receives the set of one or more accuracy requirements in response to sending, to the requirements-providing network entity, a request for accuracy requirements. In some aspects, the requirements-using network entity comprises a user equipment, a customer premises equipment, a base station, an intelligent reflecting surface (IRS), a repeater node, or an integrated access and backhaul (IAB) node. In some aspects, the requirements-providing network entity comprises a user equipment, a customer premises equipment, a base station, a location server, or an application server. In some aspects, a positioning accuracy requirement comprises an accuracy in degrees. In some aspects, a measurement accuracy requirement comprises an accuracy in decibels.

In an aspect, a requirements-providing network entity includes means for determining a set of one or more accuracy requirements for a requirements-using network entity, each accuracy requirement comprising a positioning accuracy requirement or a measurement accuracy requirement for azimuth, elevation, or both; and means for sending the set of one or more accuracy requirements to the requirements-using network entity. In some aspects, the requirements-providing network entity sends the set of one or more accuracy requirements in response to receiving, from the requirements-using network entity, a request for accuracy requirements. In some aspects, the method includes means for receiving, from the requirements-using network entity, a notification that the set of one or more accuracy requirements cannot be met. In some aspects, the notification that the set of one or more accuracy requirements cannot be met indicates a positioning accuracy requirement that cannot be met, a measurement accuracy requirement that cannot be met, a positioning accuracy requirement that can be met, or a measurement accuracy requirement that can be met, or a combination thereof. In some aspects, the method includes means for determining, based on the positioning accuracy requirement that cannot be met, the measurement accuracy requirement that cannot be met, the positioning accuracy requirement that can be met, or the measurement accuracy requirement that can be met, or a combination thereof, a second set of one or more accuracy requirements for the requirements-using network entity; and means for sending the second set of one or more accuracy requirements to the requirements-using network entity. In some aspects, the requirements-providing network entity comprises a user equipment, a customer premises equipment, a base station, a location server, or an application server. In some aspects, the requirements-using network entity comprises a user equipment, a customer premises equipment, or a base station.

In an aspect, a requirements-using network entity includes an array of antenna elements; a memory; at least one transceiver; and at least one processor communicatively coupled to the memory and the at least one transceiver, the at least one processor configured to: means for determining a plurality of antenna subarray configurations, each antenna subarray configuration comprising a different subset of the antenna elements in the array of antenna elements; means for receiving, via the at least one transceiver, from a requirements-providing network entity, a set of one or more accuracy requirements, each accuracy requirement comprising a positioning accuracy requirement or a measurement accuracy requirement for azimuth, elevation, or both; means for performing a positioning operation using the antenna elements in the antenna subarray configuration that produces a beam that satisfies the set of one or more accuracy requirements; and means for notifying the requirements-providing network entity that the set of one or more accuracy requirements cannot be met. In some aspects, the at least one processor configured to notify the requirements-providing network entity that the set of one or more accuracy requirements cannot be met comprises the at least one processor configured to indicate, to the requirements-providing network entity, positioning accuracy requirements that can be met, or measurement accuracy requirements that can be met, or a combination thereof. In some aspects, the requirements-using network entity receives the set of one or more accuracy requirements in response to sending, via the at least one transceiver, a request for accuracy requirements to the requirements-providing network entity. In some aspects, the requirements-using network entity comprises a user equipment, a customer premises equipment, a base station, an intelligent reflecting surface (IRS), a repeater node, or an integrated access and backhaul (IAB) node. In some aspects, the requirements-providing network entity comprises a user equipment, a customer premises equipment, a base station, a location server, or an application server. In some aspects, a positioning accuracy requirement comprises an accuracy in degrees. In some aspects, a measurement accuracy requirement comprises an accuracy in decibels.

In an aspect, a requirements-providing network entity includes a memory; at least one transceiver; and at least one processor communicatively coupled to the memory and the at least one transceiver, the at least one processor configured to: means for determining a set of one or more accuracy requirements for a requirements-using network entity, each accuracy requirement comprising a positioning accuracy requirement or a measurement accuracy requirement for azimuth, elevation, or both; and means for sending, via the at least one transceiver, the set of one or more accuracy requirements to the requirements-using network entity. In some aspects, the at least one processor is further configured to send the set of one or more accuracy requirements in response to receiving, from the requirements-using network entity, a request for accuracy requirements. In some aspects, the at least one processor is further configured to: means for receiving, via the at least one transceiver, from the requirements-using network entity, a notification that the set of one or more accuracy requirements cannot be met. In some aspects, the notification that the set of one or more accuracy requirements cannot be met indicates a positioning accuracy requirement that cannot be met, a measurement accuracy requirement that cannot be met, a positioning accuracy requirement that can be met, or a measurement accuracy requirement that can be met, or a combination thereof. In some aspects, the at least one processor is further configured to: means for determining, based on the positioning accuracy requirement that cannot be met, the measurement accuracy requirement that cannot be met, the positioning accuracy requirement that can be met, or the measurement accuracy requirement that can be met, or a combination thereof, a second set of one or more accuracy requirements for the requirements-using network entity; and means for sending, via the at least one transceiver, the second set of one or more accuracy requirements to the requirements-using network entity. In some aspects, the requirements-providing network entity comprises a user equipment, a customer premises equipment, a base station, a location server, or an application server. In some aspects, the requirements-using network entity comprises a user equipment, a customer premises equipment, or a base station.

In an aspect, a non-transitory computer-readable medium storing computer-executable instructions that, when executed by a requirements-using network entity, cause the requirements-using network entity to: determine a plurality of antenna subarray configurations, each antenna subarray configuration comprising a different subset of the antenna elements in the array of antenna elements; receive, from a requirements-providing network entity, a set of one or more accuracy requirements, each accuracy requirement comprising a positioning accuracy requirement or a measurement accuracy requirement for azimuth, elevation, or both; perform a positioning operation using the antenna elements in the antenna subarray configuration that produces a beam that satisfies the set of one or more accuracy requirements; and notify the requirements-providing network entity that the set of one or more accuracy requirements cannot be met.

In an aspect, a non-transitory computer-readable medium storing computer-executable instructions that, when executed by a requirements-providing network entity, cause the requirements-providing network entity to: determine a set of one or more accuracy requirements for a requirements-using network entity, each accuracy requirement comprising a positioning accuracy requirement or a measurement accuracy requirement for azimuth, elevation, or both; and send the set of one or more accuracy requirements to the requirements-using network entity.

In an aspect, a non-transitory computer-readable medium storing computer-executable instructions that, when executed by a requirements-using network entity, cause the requirements-using network entity to: an array of antenna elements; a memory; at least one transceiver; and at least one processor communicatively coupled to the memory and the at least one transceiver, the at least one processor configured to: determine a plurality of antenna subarray configurations, each antenna subarray configuration comprising a different subset of the antenna elements in the array of antenna elements; receive, via the at least one transceiver, from a requirements-providing network entity, a set of one or more accuracy requirements, each accuracy requirement comprising a positioning accuracy requirement or a measurement accuracy requirement for azimuth, elevation, or both; perform a positioning operation using the antenna elements in the antenna subarray configuration that produces a beam that satisfies the set of one or more accuracy requirements; and notify the requirements-providing network entity that the set of one or more accuracy requirements cannot be met.

In an aspect, a non-transitory computer-readable medium storing computer-executable instructions that, when executed by a requirements-providing network entity, cause the requirements-providing network entity to: a memory; at least one transceiver; and at least one processor communicatively coupled to the memory and the at least one transceiver, the at least one processor configured to: determine a set of one or more accuracy requirements for a requirements-using network entity, each accuracy requirement comprising a positioning accuracy requirement or a measurement accuracy requirement for azimuth, elevation, or both; and send, via the at least one transceiver, the set of one or more accuracy requirements to the requirements-using network entity.

Implementation examples are described in the following numbered clauses:

Clause 1. A method of wireless communication performed by a requirements-using network entity having an array of antenna elements, the method comprising: determining a plurality of antenna subarray configurations, each antenna subarray configuration comprising a different subset of the antenna elements in the array of antenna elements; receiving, from a requirements-providing network entity, a set of one or more accuracy requirements, each accuracy requirement comprising a positioning accuracy requirement or a measurement accuracy requirement for azimuth, elevation, or both; in response to the presence of an antenna subarray configuration that produces a beam that satisfies the set of accuracy requirements, performing a positioning operation using the antenna elements in the antenna subarray configuration; and in response to the absence of an antenna subarray configuration produces a beam that satisfies the set of accuracy requirements, notifying the requirements-providing network entity that the set of accuracy requirements cannot be met.

Clause 2. The method of clause 1, wherein notifying the requirements-providing network entity that the set of accuracy requirements cannot be met further comprises indicating to the requirements-providing network entity positioning accuracy requirements that can be met, or measurement accuracy requirements that can be met, or a combination thereof.

Clause 3. The method of any of clauses 1 to 2, wherein the requirements-using network entity receives the set of one or more accuracy requirements in response to sending, to the requirements-providing entity, a request for accuracy requirements.

Clause 4. The method of any of clauses 1 to 3, wherein the requirements-using network entity comprises a user equipment, a customer premises equipment, a base station, an intelligent reflecting surface (IRS), a repeater node, or an integrated access and backhaul (IAB) node.

Clause 5. The method of any of clauses 1 to 4, wherein the requirements-providing network entity comprises a user equipment, a customer premises equipment, a base station, a location server, or an application server.

Clause 6. The method of any of clauses 1 to 5, wherein a positioning accuracy requirement comprises an accuracy in degrees.

Clause 7. The method of any of clauses 1 to 6, wherein a measurement accuracy requirement comprises an accuracy in decibels.

Clause 8. A method of wireless communication performed by a requirements-providing network entity, the method comprising: determining a set of one or more accuracy requirements for a requirements-using network entity, each accuracy requirement comprising a positioning accuracy requirement or a measurement accuracy requirement for azimuth, elevation, or both; and sending the set of one or more accuracy requirements to the requirements-using network entity.

Clause 9. The method of clause 8, wherein the requirements-providing network entity sends the set of accuracy requirements in response to receiving, from the requirements-using network entity, a request for accuracy requirements.

Clause 10. The method of any of clauses 8 to 9, further comprising: receiving, from the requirements-using network entity, a notification that the set of accuracy requirements cannot be met.

Clause 11. The method of clause 10, wherein the notification that the set of accuracy requirements cannot be met indicates positioning accuracy requirements that cannot be met, measurement accuracy requirements that cannot be met, positioning accuracy requirements that can be met, or measurement accuracy requirements that can be met, or a combination thereof.

Clause 12. The method of clause 11, further comprising: determining, based on the positioning accuracy requirements that cannot be met, the measurement accuracy requirements that cannot be met, the positioning accuracy measurements that can be met, or the measurement accuracy requirements that can be met, or a combination thereof, a second set of one or more accuracy requirements for the requirements-using network entity; and sending the second set of one or more accuracy requirements to the requirements-using network entity.

Clause 13. The method of any of clauses 8 to 12, wherein the requirements-providing network entity comprises a user equipment, a customer premises equipment, a base station, a location server, or an application server.

Clause 14. The method of any of clauses 8 to 13, wherein the requirements-using network entity comprises a user equipment, a customer premises equipment, or a base station.

Clause 15. An apparatus comprising a memory, at least one transceiver, and at least one processor communicatively coupled to the memory and the at least one transceiver, the memory, the at least one transceiver, and the at least one processor configured to perform a method according to any of clauses 1 to 14.

Clause 16. An apparatus comprising means for performing a method according to any of clauses 1 to 14.

Clause 17. A non-transitory computer-readable medium storing computer-executable instructions, the computer-executable comprising at least one instruction for causing a computer or processor to perform a method according to any of clauses 1 to 14.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a requirements-using network entity having an array of antenna elements, the method comprising:
   determining a plurality of antenna subarray configurations, each antenna subarray configuration comprising a different subset of the antenna elements in the array of antenna elements;
   receiving, from a requirements-providing network entity, a set of one or more accuracy requirements, each accuracy requirement comprising a positioning accuracy requirement for azimuth, elevation, or both, or a measurement accuracy requirement for azimuth, elevation, or both;
   in response to presence of an antenna subarray configuration that produces a beam that satisfies the set of one or more accuracy requirements, performing a positioning operation using the antenna elements in the antenna subarray configuration that produces a beam that satisfies the set of one or more accuracy requirements; and
   in response to absence of an antenna subarray configuration that produces a beam that satisfies the set of one or more accuracy requirements, notifying the requirements-providing network entity that the set of one or more accuracy requirements cannot be met.

2. The method of claim 1, wherein notifying the requirements-providing network entity that the set of one or more accuracy requirements cannot be met further comprises indicating, to the requirements-providing network entity, positioning accuracy requirements that can be met, or measurement accuracy requirements that can be met, or a combination thereof.

3. The method of claim 1, wherein the requirements-using network entity receives the set of one or more accuracy requirements in response to sending, to the requirements-providing network entity, a request for accuracy requirements.

4. The method of claim 1, wherein the requirements-using network entity comprises a user equipment, a customer premises equipment, a base station, an intelligent reflecting surface (IRS), a repeater node, or an integrated access and backhaul (IAB) node.

5. The method of claim 1, wherein the requirements-providing network entity comprises a user equipment, a customer premises equipment, a base station, a location server, or an application server.

6. The method of claim 1, wherein a positioning accuracy requirement comprises an accuracy in degrees.

7. The method of claim 1, wherein a measurement accuracy requirement comprises an accuracy in decibels.

8. A method of wireless communication performed by a requirements-providing network entity, the method comprising:
 determining a set of one or more accuracy requirements for a positioning use, each accuracy requirement comprising a positioning accuracy requirement for azimuth, elevation, or both, or a measurement accuracy requirement for azimuth, elevation, or both; and
 sending the set of one or more accuracy requirements to a requirements-using network entity.

9. The method of claim 8, wherein the requirements-providing network entity sends the set of one or more accuracy requirements in response to receiving, from the requirements-using network entity, a request for accuracy requirements.

10. The method of claim 8, further comprising:
 receiving, from the requirements-using network entity, a notification that the set of one or more accuracy requirements cannot be met.

11. The method of claim 10, wherein the notification that the set of one or more accuracy requirements cannot be met indicates a positioning accuracy requirement that cannot be met, a measurement accuracy requirement that cannot be met, a positioning accuracy requirement that can be met, or a measurement accuracy requirement that can be met, or a combination thereof.

12. The method of claim 11, further comprising:
 determining, based on the positioning accuracy requirement that cannot be met, the measurement accuracy requirement that cannot be met, the positioning accuracy requirement that can be met, or the measurement accuracy requirement that can be met, or a combination thereof, a second set of one or more accuracy requirements for the requirements-using network entity; and
 sending the second set of one or more accuracy requirements to the requirements-using network entity.

13. The method of claim 8, wherein the requirements-providing network entity comprises a user equipment, a customer premises equipment, a base station, a location server, or an application server.

14. The method of claim 8, wherein the requirements-using network entity comprises a user equipment, a customer premises equipment, or a base station.

15. A requirements-using network entity, comprising:
 an array of antenna elements;
 a memory;
 at least one transceiver; and
 at least one processor communicatively coupled to the memory and the at least one transceiver, the at least one processor configured to:
 determine a plurality of antenna subarray configurations, each antenna subarray configuration comprising a different subset of the antenna elements in the array of antenna elements;
 receive, via the at least one transceiver, from a requirements-providing network entity, a set of one or more accuracy requirements, each accuracy requirement comprising a positioning accuracy requirement for azimuth, elevation, or both, or a measurement accuracy requirement for azimuth, elevation, or both;
 in response to presence of an antenna subarray configuration that produces a beam that satisfies the set of one or more accuracy requirements, perform a positioning operation using the antenna elements in the antenna subarray configuration that produces a beam that satisfies the set of one or more accuracy requirements; and
 in response to absence of an antenna subarray configuration that produces a beam that satisfies the set of one or more accuracy requirements, notify the requirements-providing network entity that the set of one or more accuracy requirements cannot be met.

16. The requirements-using network entity of claim 15, wherein the at least one processor configured to notify the requirements-providing network entity that the set of one or more accuracy requirements cannot be met comprises the at least one processor configured to indicate, to the requirements-providing network entity, positioning accuracy requirements that can be met, or measurement accuracy requirements that can be met, or a combination thereof.

17. The requirements-using network entity of claim 15, wherein the requirements-using network entity receives the set of one or more accuracy requirements in response to sending, via the at least one transceiver, a request for accuracy requirements to the requirements-providing network entity.

18. The requirements-using network entity of claim 15, wherein the requirements-using network entity comprises a user equipment, a customer premises equipment, a base station, an intelligent reflecting surface (IRS), a repeater node, or an integrated access and backhaul (IAB) node.

19. The requirements-using network entity of claim 15, wherein the requirements-providing network entity comprises a user equipment, a customer premises equipment, a base station, a location server, or an application server.

20. The requirements-using network entity of claim 15, wherein a positioning accuracy requirement comprises an accuracy in degrees.

21. The requirements-using network entity of claim 15, wherein a measurement accuracy requirement comprises an accuracy in decibels.

22. A requirements-providing network entity, comprising:
 a memory;
 at least one transceiver; and
 at least one processor communicatively coupled to the memory and the at least one transceiver, the at least one processor configured to:
 determine a set of one or more accuracy requirements for a positioning use, each accuracy requirement comprising a positioning accuracy requirement for azimuth, elevation, or both, or a measurement accuracy requirement for azimuth, elevation, or both; and
 send, via the at least one transceiver, the set of one or more accuracy requirements to a requirements-using network entity.

23. The requirements-providing network entity of claim 22, wherein the at least one processor is further configured to send the set of one or more accuracy requirements in response to receiving, from the requirements-using network entity, a request for accuracy requirements.

24. The requirements-providing network entity of claim 22, wherein the at least one processor is further configured to:
 receive, via the at least one transceiver, from the requirements-using network entity, a notification that the set of one or more accuracy requirements cannot be met.

25. The requirements-providing network entity of claim 24, wherein the notification that the set of one or more accuracy requirements cannot be met indicates a positioning accuracy requirement that cannot be met, a measurement accuracy requirement that cannot be met, a positioning accuracy requirement that can be met, or a measurement accuracy requirement that can be met, or a combination thereof.

26. The requirements-providing network entity of claim 25, wherein the at least one processor is further configured to:
- determine, based on the positioning accuracy requirement that cannot be met, the measurement accuracy requirement that cannot be met, the positioning accuracy requirement that can be met, or the measurement accuracy requirement that can be met, or a combination thereof, a second set of one or more accuracy requirements for the requirements-using network entity; and
- send, via the at least one transceiver, the second set of one or more accuracy requirements to the requirements-using network entity.

27. The requirements-providing network entity of claim 22, wherein the requirements-providing network entity comprises a user equipment, a customer premises equipment, a base station, a location server, or an application server.

28. The requirements-providing network entity of claim 22, wherein the requirements-using network entity comprises a user equipment, a customer premises equipment, or a base station.

* * * * *